April 17, 1945. C. I. HUMMER 2,373,832
LUBRICATED PLUG VALVE
Filed July 2, 1943
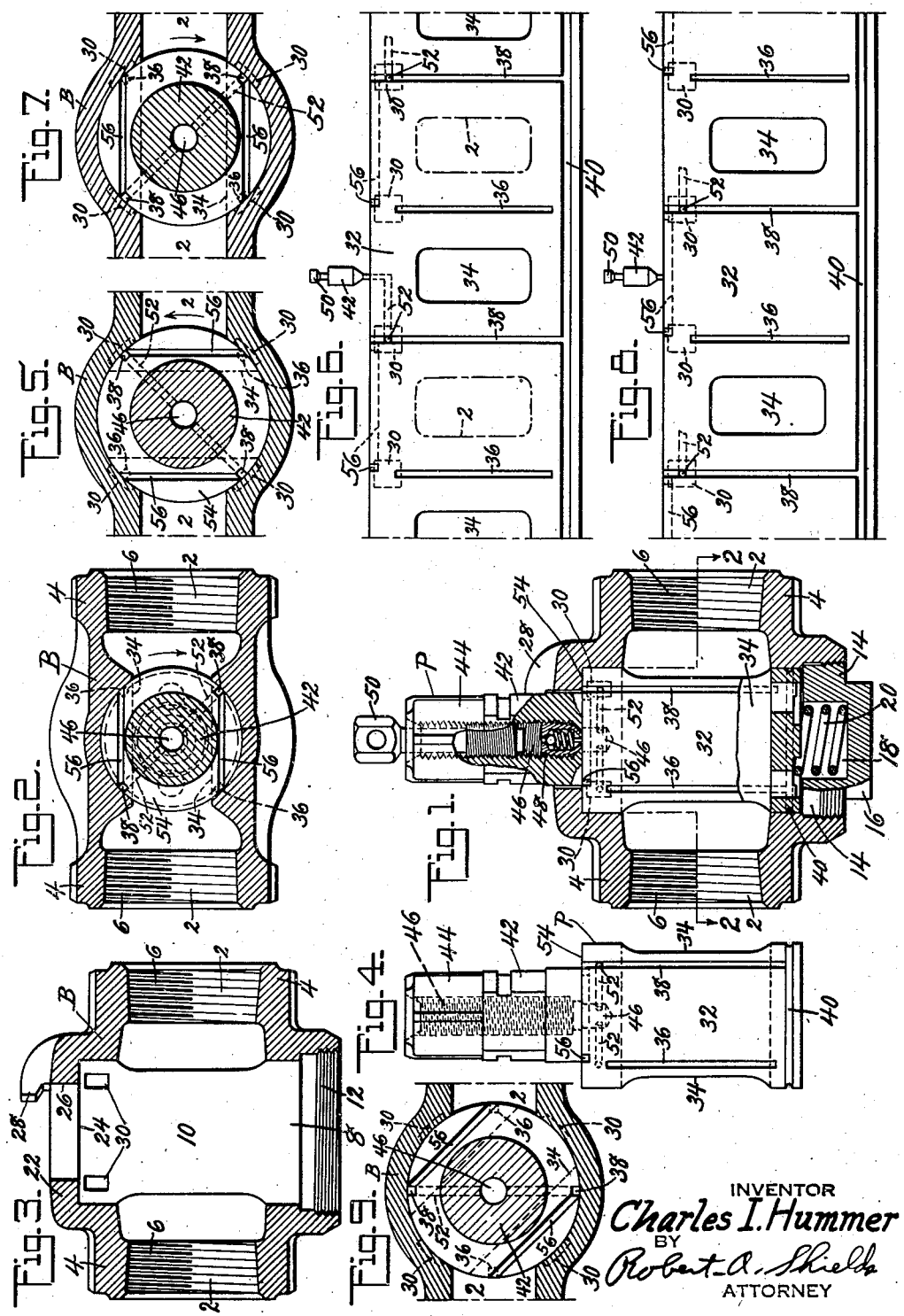
INVENTOR
Charles I. Hummer
BY
Robert A. Shields
ATTORNEY Patented Apr. 17, 1945

2,373,832

UNITED STATES PATENT OFFICE 2,373,832

LUBRICATED PLUG VALVE

Charles I. Hummer, Detroit, Mich., assignor to American Car and Foundry Company, New York, N. Y., a corporation of New Jersey Application July 2, 1943, Serial No. 493,214

7 Claims. (Cl. 251—93)

The invention relates to valves in general and in particular to lubricated plug valves of the quarter-turn type. In any fully lubricated valve certain lubricant passages are exposed to line fluid during turning of the valve and consequently some of the lubricant may be washed out. It is an object, therefore, of the present invention to provide a lubricated plug valve in which the exposed groove or lubricant duct is fully isolated from the remainder of the system when the groove is exposed.

A further object of the invention is the provision of a lubricated plug valve with the lubricant conducting grooves so arranged as to form a substantially complete frame of supply grooves around the body parts when the valve is in its closed position.

A still further object of the invention is the provision of a lubricated plug valve having a new and improved arrangement of lubricant conducting grooves.

These and other objects of the invention will be apparent to persons skilled in the art from a study of the following description and accompanying drawing, in which Figure 1 is a partial sectional view disclosing an improved valve;

Fig. 2 is a sectional view taken substantially on line 2—2 of Fig. 1;

Fig. 3 is a sectional view of the valve body;

Fig. 4 is an elevational view of the improved valve plug;

Fig. 5 is a partial sectional view similar to Fig. 2 but disclosing the valve in closed position;

Fig. 6 is a developed view of the seating surfaces and showing the valve in closed position;

Fig. 7 is a partial sectional view similar to Fig. 5 but disclosing the valve in open position;

Fig. 8 is a view showing a development of the seating surfaces when the valve is in open position, and Fig. 9 is a partial sectional view similar to Figs. 5 and 7 but showing the valve in a partially open position with certain of the grooves exposed to line fluid.

Referring now to the drawing in detail, it will be seen that the valve as a whole is constructed of two main parts, namely, the body B and plug P. The body B is formed in any suitable manner and is provided with a passageway 2 defined at its ends by flanges 4 internally threaded as at 6 to accommodate piping or other fixtures to which the valve may be attached. Intersecting the passageway 2 substantially at right angles is a cylindrical bore 8 which is carefully machined or otherwise surfaced to provide a substantially cylindrical seating surface 10. The lower portion of the bore is counter-bored and threaded as at 12 to receive the base cap 14 having a wrench-receiving projection 16 recessed as at 18 to accommodate a compression spring 20. The upper or head end of the cylindrical bore is partially closed by overhanging head portion 22 which has its inner surface carefully machined or otherwise treated to provide a head seating surface 24 substantially normal to the seating surface 10 of the bore. The head portion of the body is provided with a central opening 26 for reception of the plug stem later to be described. In order to limit the rotation of the plug a stop 28 is provided on the head and with its inner end overhanging the opening or hole 26. The substantially cylindrical seating surface 10 is interrupted at four equally spaced points by dwarf grooves or cavities 30. These dwarf grooves or cavities are placed adjacent to the sides of the passageway 2 but above such passageway as is clearly shown in the figures, particularly 1 and 3.

The plug P is of cylindrical form having the outer surface carefully machined or otherwise treated to provide a substantially cylindrical seating surface 32. This substantially cylindrical seating surface is interrupted by a plug passageway 34 extending completely through the plug and preferably of an area substantially equal to the area of passageway 2. The substantially cylindrical seating surface is also interrupted at diametrically opposed points by comparatively short longitudinally extending grooves 36 and relatively long longitudinal groove 38. As clearly shown, the grooves 36 are of a length but slightly greater than the height of the passageway 34, while the grooves 38 extend from the top edge of the plug downwardly to substantially the bottom of the plug where they intersect a circumferential groove 40 interrupting the seating surface 32 slightly above the bottom edge of the plug. The bottom of the plug is recessed to provide a seat for the compression spring 20 used to urge the plug upwardly toward the head portion of the body, as clearly shown in Fig. 1. Movement of the plug is controlled by means of the stem 42 extending through head opening 26 and this stem is provided with a wrench-receiving portion 44. The stem is axially bored as at 46 and threaded to receive a check valve assembly 48 and a screw or ram 50 by means of which pressure may be applied to lubricant inserted in the axial bore or hole 46. In order to conduct lubricant from the hole 46 to the grooves 38 short radial holes 52 are provided extending from the inner part of the groove 38 inward to intersect the hole 46. The upper end of the plug adjacent the stem is carefully machined or otherwise treated to provide a head seating surface 54 adapted to cooperate with the head seating surface 24 of the body. The seating surface 54 is interrupted at diametrically spaced points by the upper ends of relatively long longitudinal grooves 38, as well as by chordal grooves 56, extending from the upper ends of grooves 38 across the upper shoulder of the plug and substantially parallel to each other. These chordal grooves are also, as clearly shown, substantially parallel to the sides of the plug passageway 34 and accordingly, as shown in Figs. 5 and 6, will be located in a plane extending directly across the passageway 2 of the body and will with grooves 36, 38 and 40 form a substantially complete groove circuit surrounding the body parts when the valve is in the closed position. The ends of chordal grooves 56, remote from longitudinal grooves 38, interrupt the seating surface 32 substantially directly above the short longitudinal grooves 36. The ends of the chlordal grooves 56 and the upper ends of longitudinal grooves 36 are so positioned as to register with the dwarf grooves or cavities 30 previously referred to and which interrupt the seating surface 10 of the body. The ends of the chordal grooves 56 and short longitudinal grooves 36 are only in register with the dwarf grooves or cavities 30 when the valve is in full open or full closed position as shown by Figs. 5 to 8, but out of register when the valve is in a partially open or closed position as shown in Fig. 9.

From the preceding it will be seen that lubricant inserted in hole 46 may, by turning the ram or screw 50, be forced through radial passages 52 into long longitudinal grooves 38. Some of this lubricant can flow downwardly in grooves 38 and fill circumferential groove 40 at the base of the plug. The remainder of the lubricant may flow upwardly toward the head of the plug and into chordal grooves 56. When the valve is in the full open or full closed position the lubricant flowing in chordal grooves 56 may also fill short longitudinal grooves 36 by flowing through the dwarf grooves or cavities 30 interrupting the body seating surface 10. When the valve is in any position other than full open or full closed the ends of the chordal grooves 56 will be out of register with the dwarf grooves 30 and lubricant cannot flow into longitudinal grooves 36. In other words, grooves 36 will be fully isolated from the remainder of the system at all times except when the valve is in full open or full closed position. The entire system, except for groove 36, may be lubricated at all times by operating the screw or ram 50 and movement of the plug in the body will cause the lubricant to be smeared over substantially the entire seating surfaces of the plug and body. In other words, the supply grooves 38, and chordal grooves 56 will in their movement with the plug smear lubricant over the seating surfaces. That is, the supply grooves 38 will sweep across the body seating surface to smear lubricant directly thereon and the chordal grooves as they rotate with the plug will sweep substantially the entire body head seating surface and smear it with lubricant. It is to be noted that the grooves 38 and the ends of chordal grooves 56 will completely lubricate the upper portion of the cylindrical seating surfaces as well as the edges of the head seating surfaces, thus effectively preventing any head or stem leaks.

The circumferential groove 40 will, of course, prevent any leakage past the plug at the bottom thereof. Thus it will be seen that the valve seating surfaces are effectively supplied or smeared with lubricant by supply grooves, the bulk of which are never exposed to line fluid, and the minor portion of which, when exposed, are fully isolated from the system. It will also be seen that although the valve has been described more or less in detail, various modifications and rearrangements of parts, other than those shown and described, may be made and all such modifications and rearrangements of parts are contemplated as will fall within the scope of the appended claims.

What is claimed is:

1. In a lubricated valve the combination of a valve body having a passageway therethrough for the flow of matter, a substantially cylindrical bore formed in the body and having its axis substantially normal to the axis of said passageway and its walls finished to provide a body seating surface, a body head portion at least partially closing one end of said bore and internally finished to provide a body head seating surface, a plurality of cavities formed in the walls of said cylindrical bore and interrupting said body seating surface, a substantially cylindrical valve plug rotatably mounted in said bore and having the side and at least parts of one end finished to provide respectively plug and plug head seating surfaces, a passageway extending through the valve plug and adapted to register with said body passageway for flow of matter when said valve is in full open position, a circumferential groove interrupting said plug seating surface adjacent the lower end thereof, longitudinally extending grooves extending upwardly from said circumferential groove and interrupting said plug and plug head seating surfaces, a source of lubricant pressure carried by the plug, a radial hole connecting each of said longitudinal grooves with the source of lubricant pressure, and chordal grooves interrupting the plug head seating surface and connected to said longitudinal grooves to conduct lubricant therefrom to certain of said cavities when said valve is in substantially full open or closed position.

2. In a lubricated valve the combination of a valve body having a passageway therethrough for the flow of matter, a substantially cylindrical bore formed in the body and having its axis substantially normal to the axis of said passageway and its walls finished to provide a body seating surface, a body head portion at least partially closing one end of said bore and internally finished to provide a body head seating surface, a plurality of cavities formed in the walls of said cylindrical bore and interrupting said body seating surface, a substantially cylindrical valve plug rotatably mounted in said bore and having the side and at least parts of one end finished to provide respectively plug and plug head seating surfaces, a passageway extending through the valve plug and adapted to register with said body passageway for flow of matter when said valve is in full open position, a circumferential groove interrupting said plug seating surface adjacent the lower end thereof, longitudinally extending grooves extending upwardly from said circumferential groove and interrupting said plug and plug head seating surfaces, a source of lubricant pressure carried by the plug, a radial hole connecting each of said longitudinal grooves with the source of lubricant pressure, and chordal grooves interrupting the plug head seating surface and extending from the head end of the longitudinal grooves across the plug head to interrupt the plug seating surface and register with certain of said cavities when said valve is in substantially full open or closed position.

3. In a lubricated valve the combination of a valve body having a passageway therethrough for the flow of matter, a substantially cylindrical bore formed in the body and having its axis substantially normal to the axis of said passageway and its walls finished to provide a body seating surface, a body head portion at least partially closing one end of said bore and internally finished to provide a body head seating surface, a plurality of cavities formed in the walls of said cylindrical bore and interrupting said body seating surface, a substantially cylindrical valve plug rotatably mounted in said bore and having the side and at least parts of one end finished to provide respectively plug and plug head seating surfaces, a passageway extending through the valve plug and adapted to register with said body passageway for flow of matter when said valve is in full open position, a circumferential groove interrupting said plug seating surface adjacent the lower end thereof, longitudinally extending grooves extending upwardly from said circumferential groove and interrupting said plug and plug head seating surfaces, a source of lubricant pressure carried by the plug, a radial hole connecting each of said longitudinal grooves with the source of lubricant pressure, and chordal grooves interrupting the plug head seating surface and extending from the head end of the longitudinal grooves across the plug head to interrupt the plug seating surface and register with certain of said cavities when said valve is in substantially full open or closed position, said chordal grooves moving out of registry with said cavities when said valve plug is moved to a position between the substantially full open or closed position.

4. In a lubricated valve the combination of a valve body having a passageway therethrough for the flow of matter, a substantially cylindrical bore formed in the body and having its axis substantially normal to the axis of said passageway and its walls finished to provide a body seating surface, a body head portion at least partially closing one end of said bore and internally finished to provide a body head seating surface, a plurality of cavities formed in the walls of said cylindrical bore and interrupting said body seating surface, a substantially cylindrical valve plug rotatably mounted in said bore and having the side and at least parts of one end finished to provide respectively plug and plug head seating surfaces, a passageway extending through the valve plug and adapted to register with said body passageway for flow of matter when said valve is in full open position, a circumferential groove interrupting said plug seating surface adjacent the lower end thereof, longitudinally extending grooves extending upwardly from said circumferential groove and interrupting said plug and plug head seating surfaces, a source of lubricant pressure carried by the plug, a radial hole connecting each of said longitudinal grooves with the source of lubricant pressure, chordal grooves interrupting the plug head seating surface and extending from the head end of the longitudinal grooves across the plug head to interrupt the plug seating surface and register with certain of said cavities when said valve is in substantially full open or closed position, and additional longitudinal grooves interrupting said plug seating surface between said first named longitudinal grooves, said additional longitudinal grooves being so located as to register with said certain cavities only when said valve is in the substantially full open or closed position and to be fully isolated from each other and from all other grooves, holes or cavities in the valve when the valve is in any position between substantially full open or closed position.

5. In a lubricated valve the combination of a valve body having a passageway therethrough for the flow of matter, a substantially cylindrical bore formed in the body and having its axis substantially normal to the axis of said passageway and its walls finished to provide a body seating surface, a body head portion at least partially closing one end of said bore and internally finished to provide a body head seating surface, a substantially cylindrical valve plug rotatably mounted in said bore and having the side and at least parts of one end finished to provide respectively plug and plug head seating surfaces, a passageway extending through the valve plug and adapted to register with said body passageway for flow of matter when said valve is in full open position, a first set of longitudinal grooves interrupting said plug seating surface and extending upward to interrupt said plug head seating surface adjacent the periphery thereof, a second set of longitudinal grooves interrupting said plug seating surface at points spaced from said first set, a source of lubricant pressure carried by the plug, means for freely supplying lubricant under pressure from said source to said first set of longitudinal grooves at all times, and chordal grooves interrupting said plug head seating surface and extending from the head end of said first set of grooves directly across the plug head to interrupt the plug seating surface substantially above but in spaced relation to said second set of longitudinal grooves.

6. In a lubricated valve the combination of a valve body having a passageway therethrough for the flow of matter, a substantially cylindrical bore formed in the body and having its axis substantially normal to the axis of said passageway and its walls finished to provide a body seating surface, a body head portion at least partially closing one end of said bore and internally finished to provide a body head seating surface, a substantially cylindrical valve plug rotatably mounted in said bore and having the side and at least parts of one end finished to provide respectively plug and plug head seating surfaces, a passageway extending through the valve plug and adapted to register with said body passageway for flow of matter when said valve is in full open position, a first set of longitudinal grooves interrupting said plug seating surface and extending upward to interrupt said plug head seating surface adjacent the periphery thereof, a second set of longitudinal grooves interrupting said plug seating surface at points spaced from said first set, a source of lubricant pressure carried by the plug, means for supplying lubricant under pressure from said source to said first set of longitudinal grooves at all times, and chordal grooves interrupting said plug head seating surface and extending from the head end of said first set of grooves across the plug head to interrupt the plug seating surface substantially above but in spaced relation to said second set of longitudinal grooves, and means formed in said cylindrical bore for connecting the ends of said chordal grooves to said second set of longitudinal grooves at least when said valve is in substantially full open or closed position.

7. In a lubricated valve the combination of a valve body having a passageway therethrough for the flow of matter, a substantially cylindrical bore formed in the body and having its axis substantially normal to the axis of said passageway and its walls finished to provide a body seating surface, a body head portion at least partially closing one end of said bore and internally finished to provide a body head seating surface, a substantially cylindrical valve plug rotatably mounted in said bore and having the side and at least parts of one end finished to provide respectively plug and plug head seating surfaces, a passageway extending through the valve plug and adapted to register with said body passageway for flow of matter when said valve is in full open position, a plurality of longitudinal grooves interrupting said plug seating surface and extending upward to interrupt said plug head seating surface adjacent the periphery thereof, chordal grooves interrupting said plug head seating surface and connected to the head end of said longitudinal grooves, a source of lubricant pressure carried by the plug, and means for freely supplying lubricant under pressure from said source to all of said grooves at all times whereby substantially all of said seating surfaces will be smeared with lubricant from the grooves to seal the valve during turning of the plug.

CHAS. I. HUMMER.